Aug. 15, 1961  R. F. PIERCE ET AL  2,995,990
APPARATUS FOR THE PRODUCTION OF GUSSETED TUBING
Filed April 18, 1956  2 Sheets-Sheet 1
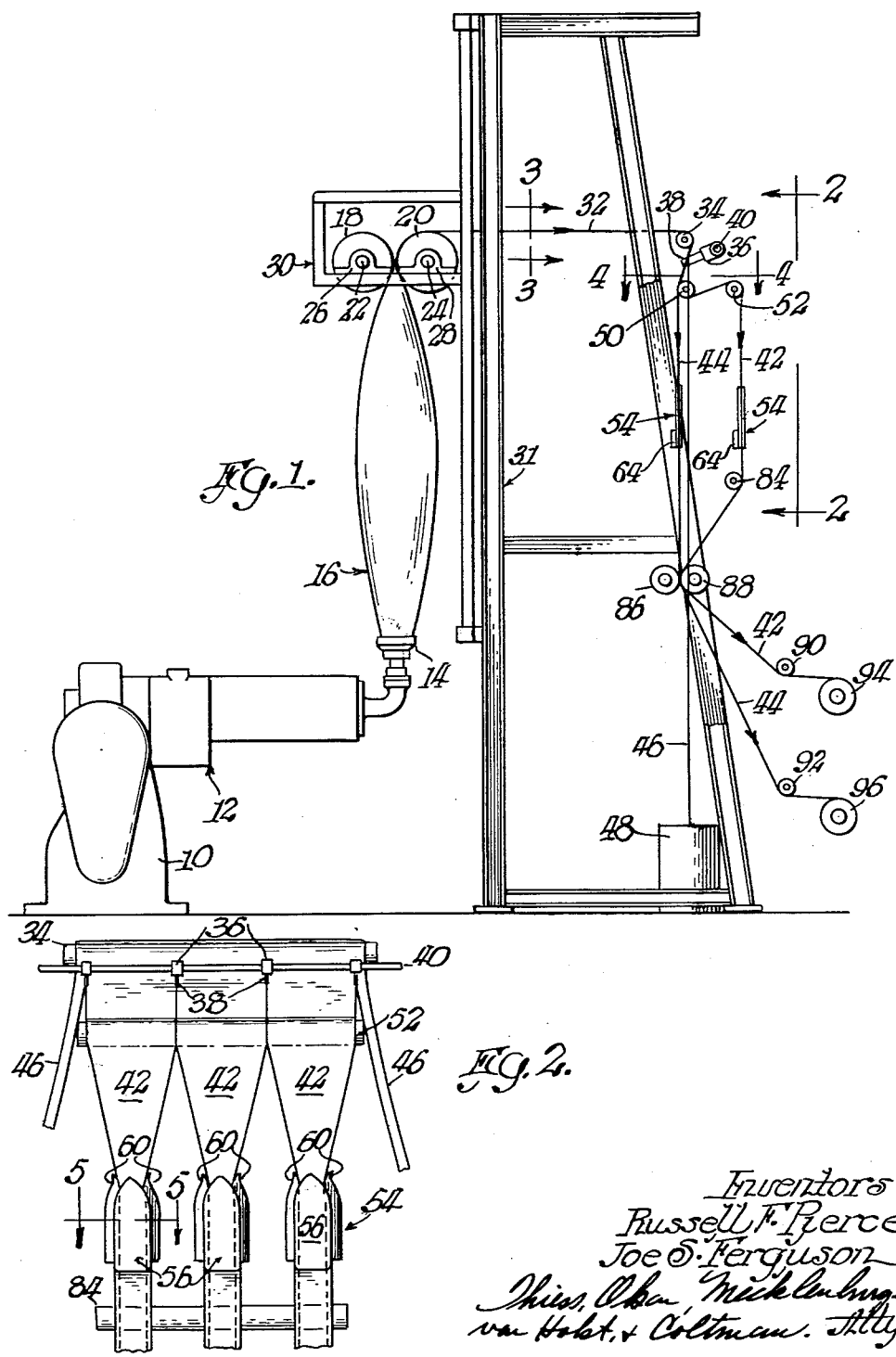

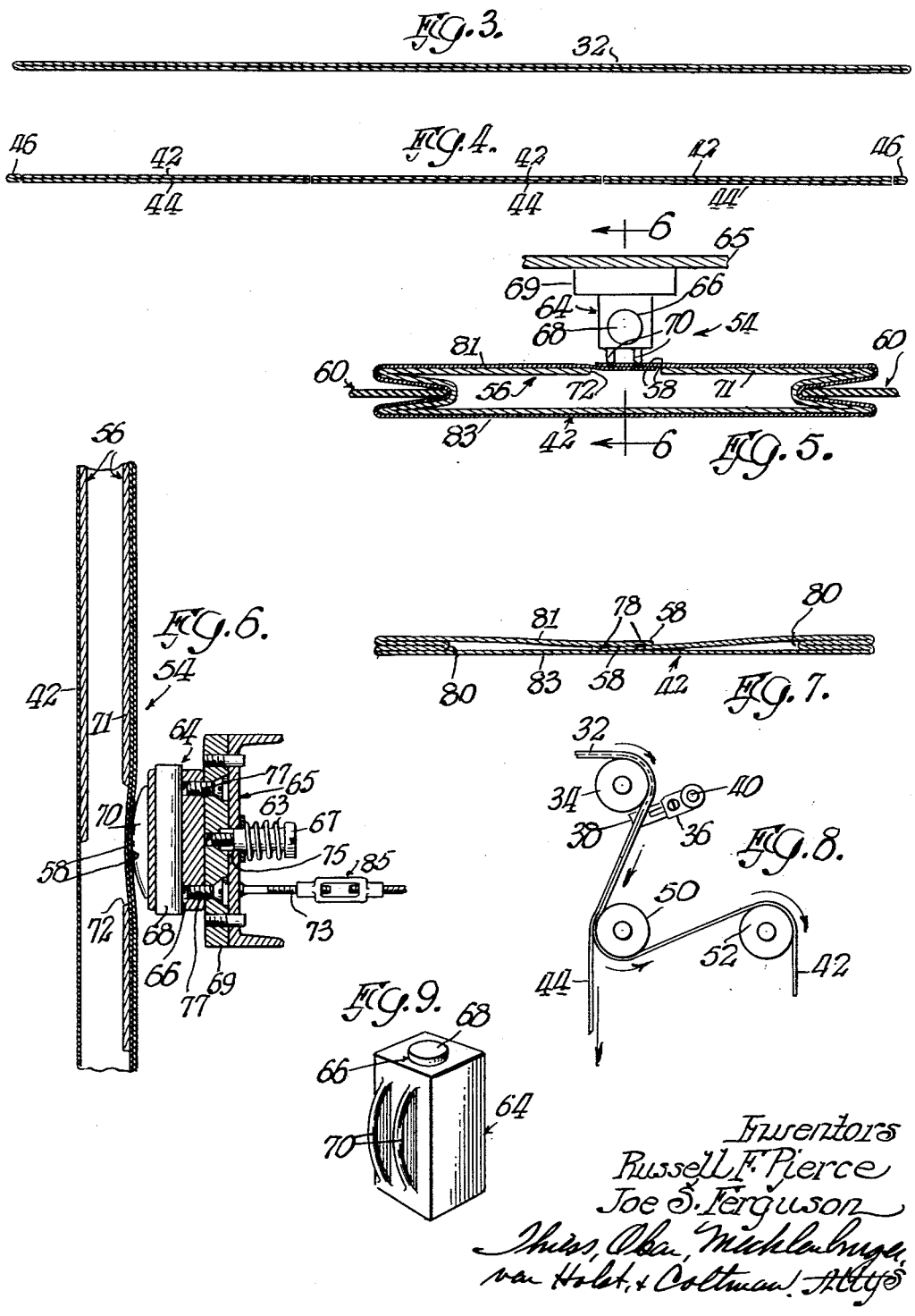

United States Patent Office 2,995,990
Patented Aug. 15, 1961

2,995,990
APPARATUS FOR THE PRODUCTION OF GUSSETED TUBING
Russell F. Pierce and Joe S. Ferguson, Terre Haute, Ind., assignors to Union Carbide Corporation, a corporation of New York
Filed Apr. 18, 1956, Ser. No. 579,035
6 Claims. (Cl. 93—20)

This invention pertains to an apparatus for the continuous production of gusseted plastic tubing having an improved heat-sealed seam.

In prior art processes for the production of gusseted plastic tubing, continuous plastic strips of predetermined widths were passed through a forming station comprising former plates and gusseting blades. The individual strips were then formed into the desired configuration with opposed side tucks or gussets; the opposed lateral end limits of the strips were overlapped so as to define a seam, and a seal formed between the overlapping seam portions. The starting material, or continuous plastic strips, had to be initially cut into appropriate widths from plastic sheet source material and wound on reels, and the continuous strips then utilized in the subsequent formation of the gusseted tubing.

It is an object of this invention to provide an apparatus for continuously forming a plurality of gusseted tubing in a rapid and facile manner.

It is a further object of this invention to provide gusseted tubing having a rugged, double-sealed seam of high strength.

It is a still further object of this invention to provide an apparatus for heat-sealing thermoplastic plies of material together which are well adapted for high speed, continuous production.

It is another object of this invention to provide apparatus for the continuous production of gusseted tubing which is efficient in operation and simple in details of construction.

The above and other objects will become more apparent upon proceeding with the following description, accompanying drawings and appended claims.

In carrying out one embodiment of this invention, a thermoplastic material is dry extruded from a melt thereof through an annular die orifice to form an inflated seamless tubing. The withdrawal of the tubing from the die is obtained by a pair of squeeze rolls spaced from the point of extrusion. The squeeze rolls also serve to collapse the inflated tubing into the form of a two-ply ribbon. The ribbon then engages a plurality of horizontally aligned slitting members disposed transversely to the path of the moving ribbon. The slitting members are previously adjusted until the proper interval is had therebetween and then secured on an aligning rod. The latter members form a plurality of discrete strips disposed in two layers from the original integral ribbon. The two coextensive layers of strips are separated, and the strips of each layer are conveyed by means of guide rolls to forming stations where each strip is formed into the configuration of a tubing having opposed side gusseted walls interposed between parallel top and bottom walls. The free lateral end limits of each strip, after forming, overlap on a top wall surface and are secured to define a seam, as is hereafter more fully explained.

Positioned adjacent one end portion of a former plate of each forming station is an adjustable heat-sealing unit having two projecting runner portions of arcuate configuration positioned in planes disposed parallel to the longitudinal axes of the overlapping seam portions of each of said strips and the former plate on which the strip is disposed. The overlapped seam portions of each of said strips slidably engage the two sealing runner portions and are fused together whereby a longitudinal seam comprising two separate parallel seal lines is formed.

The end portion of the former plate oppositely disposed to the heat-sealing unit runners has an aperture therein. The latter aperture is of such dimensions so as to enable the heat-sealing unit runners to be received therein and clear the entire aperture periphery. Since the sealing unit is adjustable relative to the fixed former plate aperture, the sealing unit runners may assume various positions relative to the aperture and the edges of the runners may assume fixed positions in the former plate aperture. The overlapped seam portions of each of said strips are supported on the unapertured portion of the former plate and move over and into the former plate aperture while slidably contacting the sealing unit projecting runners. An arc of contact will thus be effected between the heat-sealing unit arcuate runners and the plastic strip, the magnitude of which may be readily controlled by proper disposition of the runners relative to the opposed former plate aperture and is a controllable factor in the formation of the gusseted tubing seam. The formed gusseted tubing is then passed between a second set of squeeze rolls after which each finished tubing is wound on a reel member for subsequent use.

The gusseted tubing produced by the above-described process possesses two spaced seals disposed on the one surface thereof; the seals define the longitudinal seam of the tubing. The final tubing seam is tough, durable and of great strength. The number and size of gusseted tubings simultaneously formed are determined by the size of the initial extruded tubing member, and the width of the strips formed therefrom by the slitting members; the forming apparatus must obviously be of the appropriate size to form the desired tubing product. The gusseted tubing produced has a large number of uses, for example, in the packaging of foods and other items.

For a more complete understanding of this invention, reference should now be had to the drawings, wherein:

FIGURE 1 is a schematic representation of the apparatus employed in this invention;

FIG. 2 is an enlarged fragmentary elevational view taken on line 2—2 of FIG. 1;

FIG. 3 is an enlarged sectional view of the flattened tubing taken on line 3—3 of FIG. 1;

FIG. 4 is an enlarged sectional view taken on line 4—4 of FIG. 1;

FIG. 5 is an enlarged sectional view taken on line 5—5 of FIG. 2;

FIG. 6 is a sectional view taken on line 6—6 of FIG. 5;

FIG. 7 is a sectional view illustrating the cross-sectional configuration of the final tubing product of this invention;

FIG. 8 is a fragmentary end elevational view of the cutting members and associated guide rolls utilized in the provided process; and FIG. 9 is a perspective view of one of the heat-sealing units utilized in the provided process.

Referring now to the drawings wherein like reference numerals designate like parts, and more particularly to FIG. 1, the reference numeral 10 designates a support for an extruder 12 which is adapted to melt a thermoplastic composition and force it through a die 14 having an annular orifice so as to form a seamless tubing 16. Means, not shown, are provided to supply an inflating medium, such as air, to the interior of the tubing 16.

A pair of squeeze rolls 18 and 20 serve to retain the inflating medium within the tubing 16 and also withdraw the tubing from the extruder orifice 14 in a substantially vertical direction. Squeeze roll 18 is rotatably mounted on shaft 22, and squeeze roll 20 is rotatably mounted on shaft 24. The shafts 22 and 24 are, in turn, journalled in bearings 26 and 28, respectively, which are supported by a framework 30 which, is in turn, supported by a main framework 31. Either or both rolls 18 and 20 are driven by conventional means, not shown, and rotate at the same peripheral speed. A two-ply ribbon 32 results from the collapsing action of the squeeze of the squeeze rolls 18 and 20. The ribbon 32 is then conveyed by a guide roll 34 which supports the moving ribbon preliminarily to slitting of the ribbon by a plurality of blade members 38 into discrete two ply strips of predetermined width.

Each blade member 38, as is more clearly shown in FIG. 8, is secured to a blade holder 36 which is, in turn, supported on a shaft 40 which maintains the blade holders and blades in horizontal alignment, as illustrated. The blades 38 are disposed transversely in the path of travel of the moving two-ply plastic ribbon 32. The blade holders 36 are slidably adjustable on the periphery of the shaft 40 and may, therefore, be disposed at predetermined desired intervals along the length of shaft 40. The blade holders may utilize split collars or equivalent means which are releasably securable to the shaft periphery. Therefore, upon engaging the blade members 38 in the manner illustrated in FIG. 8, the collapsed tubing 32 (see FIG. 3) will be slit into a plurality of sections, each of which consists of two superposed coextensive layers of discrete thermoplastic strips 42 and 44 (see FIG. 4). The width of strips 42 and 44 is, of course, dependent upon the interval between the blade holders 36 disposed across the length of shaft 40 supporting the same.

The strips 42 and 44 formed from the two plies of the initial integral ribbon 32 may have the same or different widths depending upon the spacing of the blade members. As will be noted from FIG 4, the end portions 46 formed by the blade members 38 should be maintained as narrow as possible and are sent to waste collector 48, as illustrated in FIG. 1, for reclaiming.

Following the slitting operation, the discrete strips 42 and 44 proceed to engage a guide roll 50 preliminarily to being separated. Following the latter engagement, one series of strips 44 continues in a downward direction, as illustrated in FIGS. 1 and 8, and the second series of strips 42 moves laterally away from the strips 44 to engage a second guide roll 52 disposed to the side of guide roll 50.

Each of the plastic strips in series 42 and 44 then proceeds into forming stations 54, as illustrated in FIG. 1, where it is formed into a tubing configuration having opposed side gusseted walls and opposed top and bottom wall portions; the top wall portion has a longitudinal seam formed by the overlapping of the opposed lateral end portions of each strip.

The forming apparatus utilized in each of forming stations 54 is of the type well known in the art. It will be noted from FIGS. 2 and 5 that the forming apparatus may comprise an integral former plate 56. A transverse section of the illustrated plate 56 defines, in general, the transverse sectional configuration of a desired tubing product having opposed side gussets. The forming apparatus utilized also comprises opposed gusseting blades 60 which cooperate with the former plate 56 in the formation of the desired tubing. The outer periphery of the former plate is smooth, thereby assisting in the elimination of any wrinkles present in the thermoplastic strips as well as supporting the latter strips during the sealing operation hereinafter to be described.

Thus, after the slitting operation, the discrete plastic strips slidably engage the outer periphery of the former plate 56 and the inner edges of gusseting blades 60 and are formed by the same into the configuration illustrated in FIG. 5. Each of the plastic strips 42 and 44 then assume the configuration of a flattened tubing having opposed gussets and overlapping seam portions 58, defined by the operlapping of the opposed lateral end limits of each strip member.

Following the formation of each thermoplastic strip into the configuration of a gusseted tubing, means are provided for sealing together the overlapping seam portions of each strip. The means provided for the sealing operation comprises a movable heat-sealing unit 64 illustrated in FIG. 9. This latter sealing unit is preferably composed of a noncorrodible material having high heat transfer properties, such as brass, aluminum or stainless steel, and has a longitudinal aperture 66 therein in which is inserted a regulatable cartridge heating element 68, whereby the temperature of the sealing unit may be accordingly regulated. Formed integrally with the sealing unit 64 are projecting runner members 70 of arcuate configuration. The outermost surface of the overlapping portions of each formed plastic strip slidably engages the runners 70; the overlapping plies are thereby fused together so as to effect a seam comprising two spaced longitudinally extending heat seals therein which are rugged and durable. The runners are disposed in planes parallel to the longitudinal axis of the thermoplastic strips engaged, in the normal course of operation.

The manner in which the sealing unit 64 is utilized is more clearly understood from FIG. 5. It will be noted from this latter figure that the runners 70 of each sealing unit 64 form the double seal in the overlapping portions of each tubing member by cooperating with an aperture disposed on one face surface of the integral former plate 56. It will be noted from FIG. 6 that a surface 71 of the former plate, over which the overlapping seam of the formed tubing 42 moves, extends at its lower end limit beyond the opposed face surface of the former plate. This extending surface 71 is apertured at 72, as illustrated in FIG. 6, thereby enabling the runners 70 of the opposed fixedly positioned adjustable heat-sealing unit 64 to force the overlapping ply portions 58, or seam portions, of the moving tubing formed to pass into the latter aperture. Being of arcuate configuration, the edge surfaces of the projecting runner portions 70 of each sealing unit 64 will contact, or effect a greater arc of contact with, a larger surface area of the moving plastic film as the runner fixed positions proceed to the left, as illustrated, forcing greater areas of the overlapping plastic plies into the aperture 72 and into engagement with the runner edges. It is apparent that surface 71 of former plate 56 may be relieved to a sufficient depth and need not be apertured at 72. The flat unapertured portion of the former plate obviously supports the overlapping portions of the moving ribbon. The cooperation between the runners 70 of the sealing element 64 and the apertured face of the integral former plate 56 enables desired areas of the plastic film to be contacted by the sealing unit runners. The seal formed in the tubing is, therefore, seen to be dependent upon the speed of the thermoplastic strip movement, the temperature of the sealing unit runners and, also, on the arc of contact between the runners and the slidably engaged strip.

To effect varying arcs of contact with the thermoplastic strips, the heat-sealing units 64 are adjustable relative to the stationary former plate 56. Each sealing unit 64, as illustrated in FIG. 6, is secured to a mount 69 which is preferably composed of a heat resistant material, such as Transite, by means of bolt members 77 or other equivalent means. This latter mount is, in turn, secured to a support channel 65 by means of a securing bolt member 67 which threadedly engages the rear tapped surface of mount 69 after traversing slot 75 disposed in the channel. Adequate tension between heating unit mount 69 and the support channel 65 is assured by a coil spring member 63 interposed between the rear surface of the support channel 65 and the undersurface of the head of the securing bolt 67. Adjusting means, such as turnbuckle 85 which engages bar member 73 secured to the rear surface of the support channel 65 enables the distance between the runners 70 of the sealing unit and the opposed former plate 56 and the resulting arc of contact effected between runners 70 and the thermoplastic film to be accurately regulated. The moving plastic film is maintained under a certain degree of tautness, whereby the runners of the heat-sealing units may enable the overlapped seam portions to move into the recess 72 without danger of the overlapping strip portions separating. The optimum disposition of the runners 70 relative to the recess 72 of the former plate 56 may be readily empirically determined by those skilled in the art.

Following the slidable contact between the moving plastic film and the runners of the heat-sealing unit 64, which may be preferably coated with a material such as Teflon to reduce the coefficient of friction, two longitudinally extending twin seals 78, such as are illustrated in FIG. 7, are formed in the overlapping portions or seam of the gusseted tubing product emerging from the forming station. The double seals 78 insure a tubing product having a seam which is tough and durable and adaptable for rough handling and long wear without failure.

Upon emerging from the forming stations 54, the gusseted tubings 42 engage a guide roll 84, preliminarily to entering between a second pair of squeeze rolls 86 and 88, illustrated in FIG. 1. Upon emerging from between the latter squeeze rolls, the formed tubing 42 will be completely collapsed and have a cross section as illustrated in FIG. 7. Referring to the latter figure, it will be noted that the final flat tubing possesses opposed side gusseted walls 80 which are interposed between a top wall 81, on which are disposed the overlapping portions 58, and a bottom wall 83. The latter overlapping portions comprise a seam and are maintained together by means of the double heat seals 78 disposed therebetween. The latter seals are durable and resistant to separation.

The flat tubings 42 then proceed to engage guide rolls 90 preliminarily to being wound on reel 94, see FIG. 1, which is torque compensated to obviate any increased peripheral speed as the real diameter increases. The formed gusseted tubing 44 engaged a guide roll 92 preliminarily to being wound on a reel 96 which is also torque compensated.

It is thus apparent that an improved apparatus has been presented which enables discrete tubings having opposed side gussets and a novel double-sealed seam of great strength to be produced in a fast and economical manner. The prior art expedient of first forming strips of desired width and collecting the same on reels preliminarily to the forming operation is dispensed with. The apparatus illustrated is easy to operate and relatively inexpensive. Although the strips or plies 42 and 44 illustrated are shown as being of the same width, it is obvious that by desired spacing of the slitting members 38 and the forming station components, as well as the various roll members, gusseted tubing, having double heat-sealed seams, of different widths may be simultaneously formed. The speeds of formation and the sealing temperatures, in addition to the arc of contact, or engagement, between the heat sealer runners 70 and the opposed plastic strips will obviously vary with different materials. The optimum and most efficient conditions may be readily determined by those skilled in the art.

The above-described process is flexible and readily adaptable for use in conjunction with the methods of producing thermoplastic tubing, disclosed in United States Patents No. 2,461,975, No. 2,461,976 and No. 2,632,206.

Though the invention has been successfully operated in the production of tubing of polyethylene, the invention is not restricted thereto. In general, the invention can be utilized with any thermoplastic material, mixtures thereof, and mixtures of synthetic rubbers with thermoplastic materials. Each thermoplastic substance or composition possesses certain properties which may make it necessary to determine by experiment the variables in the process which have to be balanced in order to produce tubing of the desired characteristics. Hereinafter is set forth a list of illustrative thermoplastic materials which can be used in this invention in addition to polyethylene:

Cellulose acetate
Cellulose acetate butyrate
Ethyl cellulose
Methyl methacrylate polymer
Nylon (extrusion or molding grade)
Polystyrene
Polyvinyl formal-acetate butyral
Copolymers of vinyl chloride and vinyl acetate (Vinylite)
Polyvinyl chloride (Geon)
Copolymers of vinyl chloride and vinylidene chloride (Saran)

The properties of the thermoplastic substance or composition can be modified, as by the incorporation therein of suitable modifying agents, such as plasticizers, fillers, coloring agents, heat stabilizers, anti-oxidants, etc.

Thus, it is obvious that various changes and modifications may be made in the above description without departing from the nature or spirit thereof. For instance, the number of projecting runners 70 disposed on each heat-sealing unit may be three or more if a seam of very extraordinary strength is required. Therefore, this invention is to be restricted only as set forth in the appended claims.

What is claimed is:

1. A combination for continuously producing gusseted tubing comprising extrusion means for continuously extruding a molten thermoplastic into an inflated seamless tubing, withdrawing means spaced from said extrusion means for concomitantly withdrawing said seamless tubing from said extrusion means and collapsing the same into a two-ply ribbon, first aligning means disposed adjacent and transversely to the path of travel of said two-ply ribbon, adjustable slitting means disposed on said first aligning means in the path of said two-ply ribbon and adapted to engage the same; said slitting means being fixedly positioned on said first aligning means at spaced intervals whereby strips may be formed from said two-ply ribbon, forming means having relieved portions formed therein, disposed in alignment with such strips formed from said two-ply ribbon by said slitting means for forming said strips into tubing having opposed side gussets and a seam formed from overlapping lateral edge portions of said strips; heat-sealing means having a plurality of arcuate runner portions disposed parallel to the longitudinal axes of said strips, in contact with said seam portions disposed on said forming means relieved portions; positioning means connected to each of said heat-sealing means for positioning said heat-sealing means relative to said engaged seam and regulating the length of arcuate runners in contact with said seam portion disposed in said forming means relieved portion, and means for longitudinally moving said tubing seam portions under tension into slidable engagement with said arcuate runner portions whereby a plurality of continuous, spaced heat seals are formed in each of said strip seams disposed parallel to the longitudinal axis thereof.

2. The combination as recited in claim 1 in which said heat-sealing means are horizontally aligned on a second aligning means disposed transversely to said moving ribbon and are fixedly positioned at spaced intervals on said second aligning means.

3. In a combination for continuously forming gusseted tubing from two overlying coextensive plies of thermoplastic material moving in a path parallel to the longitudinal axis thereof, adjustable slitting means disposed transversely to the path of said coextensive plies and adapted to engage said plies and divide said plies into discrete strips, forming means disposed in alignment with each of said strips and adapted to form each of said strips into a tubing member having opposed walls and opposed side gussets and an overlapped seam formed on one wall surface thereof, one end portion of each of said forming means being apertured, heat-sealing means having two projecting runner portions of arcuate configuration oppositely disposed to said forming means apertured portion, said forming means apertured portion being of sufficient dimensions to receive said heat-sealing means runner portions therein, means for regulating the relative disposition between said forming means apertured portion and said sealing means runners, said runners being disposed parallel to the longitudinal axis of said forming means in the normal operative position and means for feeding said strips through said slitting, forming and heat-sealing means.

4. An apparatus for continuously producing a plurality of gusseted tubings comprising means for melt-extruding a thermoplastic composition into the form of an inflated seamless tubing, means spaced from said extruding means for withdrawing said tubing from said extruding means and collapsing the same into the form of a two-ply ribbon, means for dividing said ribbon into a plurality of two-ply strips arranged in the path of said moving two-ply ribbon, means in the path of travel of said two-ply strips for separating each strip into its component plies, means arranged in the path of each of said plies for forming each of said plies into a tube having opposed wall surfaces with the strip lateral edges overlapping in one of said wall surfaces, means cooperating with said forming means for infolding opposed side portions of said tubes to form gussets therein, means for heat-sealing the overlapping ply portions of said formed tubing together while moving over said forming means, whereby said forming means functions as a reinforcement, said heat-sealing means being arranged oppositely adjacent said forming means, and means for feeding said strips, individual plies and tubes to the dividing, separating, tube-forming and heat-sealing means.

5. The apparatus as recited in claim 4 in which said heat-sealing means comprises a plurality of heat-conducting projecting runners of arcuate configuration arranged parallel to the axis of strip movement.

6. Apparatus for continuously forming tubing from a moving strip of thermoplastic material comprising means for forming said strip into a tubing having a longitudinal seam defined by overlapping edge portions of said strip, a portion of said forming means over which said tubing longitudinal seam moves being apertured, means for heat-sealing said overlapping edge portions of said strip together, said heat-sealing means having two parallel runners of arcuate configuration arranged parallel to the tubing direction of movement for slidably engaging said longitudinal seam whereby two parallel seals may be formed therein in the normal course of apparatus operation, said runners being partially disposed in said forming means aperture, and means for regulating the distance between said heat-sealing means and said forming means.

References Cited in the file of this patent
UNITED STATES PATENTS

| | | |
|---|---|---|
| 2,114,625 | Bergstein | Apr. 19, 1938 |
| 2,169,936 | Wagner | Aug. 15, 1939 |
| 2,324,393 | Hohl et al. | July 13, 1943 |
| 2,347,902 | Gaubert | May 2, 1944 |
| 2,444,685 | Waters | July 6, 1948 |
| 2,452,080 | Stephenson | Oct. 26, 1948 |
| 2,465,044 | Shumann | Mar. 22, 1949 |
| 2,542,652 | Freund | Feb. 20, 1951 |
| 2,544,044 | Reber et al. | Mar. 6, 1951 |
| 2,631,332 | Reber | Mar. 17, 1953 |
| 2,641,166 | Morrel | June 8, 1953 |
| 2,688,435 | Vogt | Sept. 7, 1954 |
| 2,697,852 | Bailey | Dec. 28, 1954 |
| 2,704,183 | Stern | Mar. 15, 1955 |
| 2,741,956 | Diffenbaugh | Apr. 17, 1956 |
| 2,773,285 | Piazze et al. | Dec. 11, 1956 |

FOREIGN PATENTS

| | | |
|---|---|---|
| 744,977 | Great Britain | Feb. 15, 1956 |